United States Patent
Chandramohanan et al.

(10) Patent No.: US 10,669,889 B2
(45) Date of Patent: Jun. 2, 2020

(54) HEAT SHIELD FOR MIXED FLOW TURBINE WHEEL TURBOCHARGERS

(71) Applicant: BorgWarner Inc., Auburn Hills, MI (US)

(72) Inventors: Rajmohan T. Chandramohanan, Fletcher, NC (US); Greg Williams, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 464 days.

(21) Appl. No.: 15/114,480

(22) PCT Filed: Jan. 29, 2015

(86) PCT No.: PCT/US2015/013493
§ 371 (c)(1),
(2) Date: Jul. 27, 2016

(87) PCT Pub. No.: WO2015/119828
PCT Pub. Date: Aug. 13, 2015

(65) Prior Publication Data
US 2016/0341072 A1    Nov. 24, 2016

Related U.S. Application Data

(60) Provisional application No. 61/935,466, filed on Feb. 4, 2014.

(51) Int. Cl.
*F01D 25/14*     (2006.01)
*F01D 25/12*     (2006.01)
(Continued)

(52) U.S. Cl.
CPC ............. *F01D 25/145* (2013.01); *F01D 5/04* (2013.01); *F01D 17/14* (2013.01); *F01D 25/125* (2013.01);
(Continued)

(58) Field of Classification Search
CPC ...... F01D 25/145; F01D 25/26; F01D 25/125; F05D 2220/40
See application file for complete search history.

(56) References Cited

U.S. PATENT DOCUMENTS 4,565,505 A * 1/1986 Woollenweber ........ F01D 25/16
417/407
4,725,206 A * 2/1988 Glaser ................... F01D 25/125
415/175

(Continued)

FOREIGN PATENT DOCUMENTS

CN         1952361 A      4/2007
CN       101878359 A     11/2010
(Continued)

OTHER PUBLICATIONS

International Search Report for International Application No. PCT/US2015/013493 ; 2 pages.
(Continued)

*Primary Examiner* — Moshe Wilensky
*Assistant Examiner* — Topaz L. Elliott
(74) *Attorney, Agent, or Firm* — Young Basile Hanlon & MacFarlane, P.C.

(57) ABSTRACT

A turbocharger (18) includes a shaft (20), a mixed flow turbine wheel (40) including a wheel hub (44) and blades having tips (42), and a heat shield (11). The heat shield (11) has a side wall, an end (19), and a contoured front edge (13) that connects the sidewall (16) and the end (19). The front edge (13) of the heat shield (11) defines a slope that forms an imaginary line that is angled relative to the sidewall (16) and the end (19), and intersects an axis of rotation of the shaft (20). The heat shield (11) resides at a position that is between a bearing housing (22) of the turbocharger (18) and the turbine wheel (40), and axially inward relative to an (Continued)

axially-facing surface of a turbine volute (24), and between the bearing housing (22) and the turbine wheel (40).

5 Claims, 4 Drawing Sheets

(51) Int. Cl.
  *F02C 7/24*   (2006.01)
  *F01D 5/04*   (2006.01)
  *F01D 17/14*   (2006.01)
  *F01D 25/26*   (2006.01)
  *F02B 37/24*   (2006.01)

(52) U.S. Cl.
  CPC .............. *F01D 25/26* (2013.01); *F02B 37/24* (2013.01); *F02C 7/24* (2013.01); *F05D 2220/40* (2013.01); *F05D 2240/24* (2013.01); *F05D 2240/54* (2013.01); *F05D 2250/192* (2013.01); *F05D 2250/314* (2013.01); *F05D 2250/711* (2013.01); *F05D 2250/712* (2013.01); *F05D 2260/231* (2013.01); *Y02T 10/144* (2013.01)

(56) References Cited

U.S. PATENT DOCUMENTS

| | | | | |
|---|---|---|---|---|
| 4,786,238 | A * | 11/1988 | Glaser | F01D 25/125 |
| | | | | 415/175 |
| 4,894,990 | A * | 1/1990 | Tsubouchi | F01D 17/18 |
| | | | | 415/116 |
| 4,907,952 | A * | 3/1990 | Inoue | F01D 17/165 |
| | | | | 417/407 |
| 4,969,805 | A | 11/1990 | Romeo | |
| 5,055,009 | A * | 10/1991 | Gutknecht | F01D 25/125 |
| | | | | 384/476 |
| 5,094,587 | A * | 3/1992 | Woollenweber | F01D 9/026 |
| | | | | 415/205 |
| 7,367,190 | B2 * | 5/2008 | Shibui | F01D 25/125 |
| | | | | 290/52 |
| 7,384,236 | B2 * | 6/2008 | Meier | F01D 25/08 |
| | | | | 415/178 |
| 7,631,497 | B2 | 12/2009 | Panek | |
| 7,673,452 | B2 * | 3/2010 | Shimizu | F01D 25/12 |
| | | | | 290/52 |
| 7,802,429 | B2 * | 9/2010 | Yokoyama | F01D 9/026 |
| | | | | 60/605.1 |
| 8,052,386 | B1 * | 11/2011 | Fitzpatrick | F04D 25/08 |
| | | | | 415/218.1 |
| 9,488,070 | B2 * | 11/2016 | Li | F02C 6/12 |
| 2007/0169747 | A1 * | 7/2007 | Shimizu | F01D 25/12 |
| | | | | 123/434 |
| 2010/0104424 | A1 * | 4/2010 | Anschel | F01D 5/048 |
| | | | | 415/159 |
| 2011/0014036 | A1 | 1/2011 | Boening et al. | |
| 2014/0154069 | A1 * | 6/2014 | Martinez-Botas Mateo | |
| | | | | F01D 5/141 |
| | | | | 415/208.1 |
| 2015/0037146 | A1 * | 2/2015 | Yamaguchi | F01D 11/025 |
| | | | | 415/174.5 |
| 2016/0312651 | A1 * | 10/2016 | Boening | F01D 5/048 |

FOREIGN PATENT DOCUMENTS

| | | | | |
|---|---|---|---|---|
| DE | 3235538 | A1 * | 3/1984 | ........... F01D 25/125 |
| DE | 102009056632 | A1 | 6/2011 | |
| EP | 2215340 | A1 | 8/2010 | |
| EP | 2778349 | A1 | 9/2014 | |
| JP | 2012229676 | A * | 11/2012 | |
| JP | 2013231404 | A * | 11/2013 | |
| JP | 2013231405 | A * | 11/2013 | |
| WO | 2006018189 | A1 | 2/2006 | |
| WO | 2012114058 | A1 | 8/2012 | |
| WO | 2013125580 | A1 | 8/2013 | |
| WO | WO-2013125580 | A1 * | 8/2013 | ........... F01D 11/025 |

OTHER PUBLICATIONS

Chinese Office Action dated Aug. 24, 2018 ; Application No. 201580006687.2; Applicant: BorgWarner Inc.; 11 pages.
Extended European Search Report dated Jan. 23, 2017; Application No. 15746795.2-1006/3102805 ; Applicant: BorgWarner Inc.;15 pages.
Chinese Office Action dated Apr. 26, 2018 ; Application No. 201580006687.2 ; Applicant: BorgWarner Inc.; 15 pages.
European Search Report regarding EP Application No. 15746795.2 dated Oct. 20, 2017; Applicant: BorgWarner Inc., 120 pages.
European Office Action dated Jul. 23, 2019; Application No. 15746795.2-1006; Applicant: BorgWarner Inc.; 7 pages.

* cited by examiner

HEAT SHIELD FOR MIXED FLOW TURBINE WHEEL TURBOCHARGERS

CROSS-REFERENCE TO RELATED APPLICATION

This application claims priority to and all the benefits of U.S. Provisional Application No. 61/935,466, filed on Feb. 4, 2014, and entitled "Heat Shield For Mixed Flow Turbine Wheel Turbochargers," which is incorporated herein by reference.

BACKGROUND OF THE INVENTION

Field of the Invention

This disclosure relates to an exhaust gas turbocharger for an internal combustion engine. More particularly, this disclosure relates to a heat shield for a variable turbine geometry turbocharger having a mixed flow turbine wheel.

Description of Related Art

A turbocharger is a type of forced induction system used with internal combustion engines. Turbochargers deliver compressed air to an engine intake, allowing more fuel to be combusted, thus boosting the horsepower of the engine without significantly increasing engine weight. Thus, turbochargers permit the use of smaller engines that develop the same amount of horsepower as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which contributes to the highly desirable goal of a cleaner environment.

Turbochargers typically include a turbine housing connected to the exhaust manifold of the engine, a compressor housing connected to the intake manifold of the engine, and a center bearing housing disposed between and coupling the turbine and compressor housings together. A turbine wheel in the turbine housing is rotatably driven by an inflow of exhaust gas supplied from the exhaust manifold. A shaft is radially supported for rotation in the center bearing housing, and connects the turbine wheel to a compressor impeller in the compressor housing so that rotation of the turbine wheel causes rotation of the compressor impeller. The shaft connecting the turbine wheel and the compressor impeller defines a line which is the axis of rotation. As the compressor impeller rotates, it increases the air mass flow rate, airflow density and air pressure delivered to the cylinders of the engine via the engine intake manifold.

At low speeds there is often a delay before turbocharger boost is actually provided to the engine. This is called turbolag. To address turbolag, turbochargers may include variable turbine geometry. A variable turbine geometry turbocharger has movable guide vanes located outboard (e.g., upstream) of the turbine wheel. When the guide vanes are in the closed position, the air is directed toward the turbine wheel through narrow openings. This increases the air speed causing the turbine to spin faster than it would if the vanes were open. When the guide vanes are in the fully open position, the turbine is allowed to reach a maximum flow volume. Adjustment of the vanes helps to eliminate turbo lag and allows the turbine to provide reasonable pressure boost at both low and high engine speeds.

In a turbocharger, the turbine wheel may be a radial flow wheel in which the exhaust gas is directed along the radius of the turbine wheel, an axial flow wheel in which the exhaust gas is directed along the axis of the turbine wheel, or a mixed flow wheel in which some exhaust gas is directed along the radius of the turbine wheel, and some exhaust gas is directed along the axis of the turbine wheel. Frequently, the bearing housing is shielded from the heat of the exhaust gases by a heat shield which is placed between the turbine wheel and the bearing housing. Additionally, the heat shield can also function to direct exhaust gas toward the turbine wheel. However, due to the position of the heat shield with respect to the gas flow path through the turbocharger, the heat shield shape can affect turbine efficiency.

SUMMARY OF THE INVENTION

In some aspects, a turbocharger includes a shaft and a mixed flow turbine wheel connected to the shaft, the wheel including a wheel hub and blades having tips. The turbocharger also includes a heat shield including a side wall, an end, and a contoured front edge that connects the sidewall and the end. The contoured front edge of the heat shield defines a slope that forms an imaginary line that is angled relative to the sidewall and the end, and intersects an axis of rotation of the shaft.

The turbocharger may include one or more of the following features: The turbocharger further comprises a turbine housing including a volute and an outlet, the turbine wheel is disposed in the turbine housing between the volute and the outlet, and the heat shield resides at a position that is axially inward relative to an axially-facing surface of the volute. The contoured front edge comprises a chamfered surface. The contoured front edge comprises a convex surface. The contoured front edge comprises a concave surface. The imaginary line defined by the contoured front edge of the heat shield forms an angle of 40 degrees to 50 degrees with the axis of rotation of the shaft. The imaginary line defined by the contoured front edge of the heat shield forms an angle of 40 degrees to 45 degrees with axis of rotation of the shaft. The imaginary line defined by the contoured front edge of the heat shield forms an angle of 41 degrees to 43 degrees with the axis of rotation of the shaft. A length of the chamfered surface of the heat shield comprises 4 percent to 8 percent of a diameter of the heat shield. A length of the chamfered surface of the heat shield comprises 4.5 percent to 5.5 percent of a diameter of the heat shield. A ratio of a diameter of the wheel hub to a diameter of the turbine wheel measured at the blade tips is 0.8 to 0.9.

A variable turbine geometry turbocharger has a mixed flow turbine wheel, guide vanes, and a heat shield. In some embodiments, a front edge of the heat shield is contoured such that a slope of the contour defines an imaginary line that if extended would meet the axis of rotation of the turbocharger shaft at an angle of about 40 to 50 degrees. Exhaust gas flowing from the turbine housing is directed along the extended imaginary line defined by the slope of the contour and into the blade passage, directly between the hub and the shroud (e.g., an inner surface of the turbine housing). The contour is in the form of a chamfer, and can also be in the shape of a convex or concave curve. Further, the heat shield includes relatively short sides that prevent the heat shield from being positioned in the direct stream of exhaust gas flowing to the turbine. The turbocharger including the contoured heat shield provides greater compressor gas flow than a turbocharger of conventional construction wherein the heat shield is disposed in the direct stream of exhaust gas and wherein the heat shield does not have a front edge contour that aids in directing the flow of exhaust gas directly onto the blade passage. Thus, the heat shield is configured to provide improved turbocharger efficiency relative to some turbochargers including a conventional heat shield. The increased efficiency of the turbocharger is greatest at low vane openings, which leads to a reduction in turbolag.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION

Figure 1:
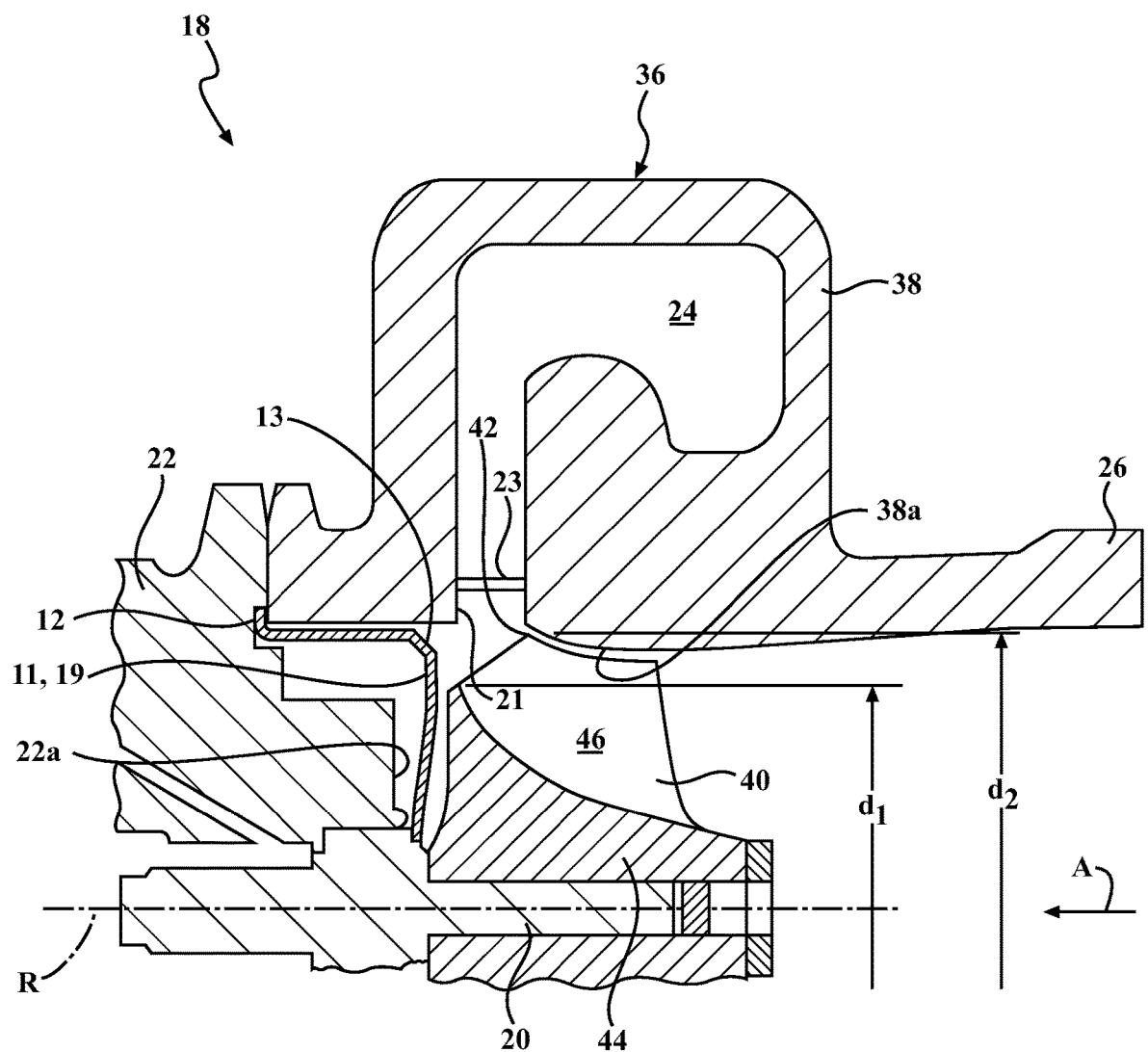
FIG. 1 is cross-sectional view of a portion of a turbine section of an exhaust gas turbocharger including a heat shield disposed behind (e.g., axially inward relative to) the axially-inward edge of the exhaust volute.

Referring to FIG. 1, a variable turbine geometry exhaust gas turbocharger 18 includes a turbine section 36, a compressor section (not shown), and a center bearing housing 22 disposed between and connecting the compressor section to the turbine section 36. The turbine section 36 includes a turbine housing 38 that defines an exhaust gas inlet (not shown), an exhaust gas outlet 26, and a turbine volute 24 disposed in the fluid path between the exhaust gas inlet and exhaust gas outlet 26. A turbine wheel 40 is disposed in the turbine housing 38 between the turbine volute 24 and the exhaust gas outlet 26. Variable guide vanes 23 are positioned in the volute 24 adjacent the turbine wheel 40 to control gas flow to the turbine wheel 40. A shaft 20 is connected to the turbine wheel 40, is radially supported for rotation within in the bearing housing 22, and extends into the compressor section. The compressor section includes a compressor housing that defines the air inlet, an air outlet, and a compressor volute. A compressor wheel is disposed in the compressor housing between the air inlet and the compressor volute and is connected to the shaft 20. A heat shield 11, described in detail below, is provided in the turbine section between the turbine wheel 40 and the bearing housing 22 to reduce heat transfer from the turbine section 36 to the bearing housing 22 and increase the efficiency of the turbocharger 18.

In use, the turbine wheel 40 is rotatably driven by an inflow of exhaust gas supplied from the exhaust manifold of an engine (not shown). Since the shaft 20 connects the turbine wheel 40 to the compressor wheel in the compressor housing, the rotation of the turbine wheel 40 causes rotation of the compressor wheel. As the compressor wheel rotates, it increases the air mass flow rate, airflow density and air pressure delivered to the engine's cylinders via an outflow from the compressor air outlet, which is connected to the engine's air intake manifold.

Figure 2:
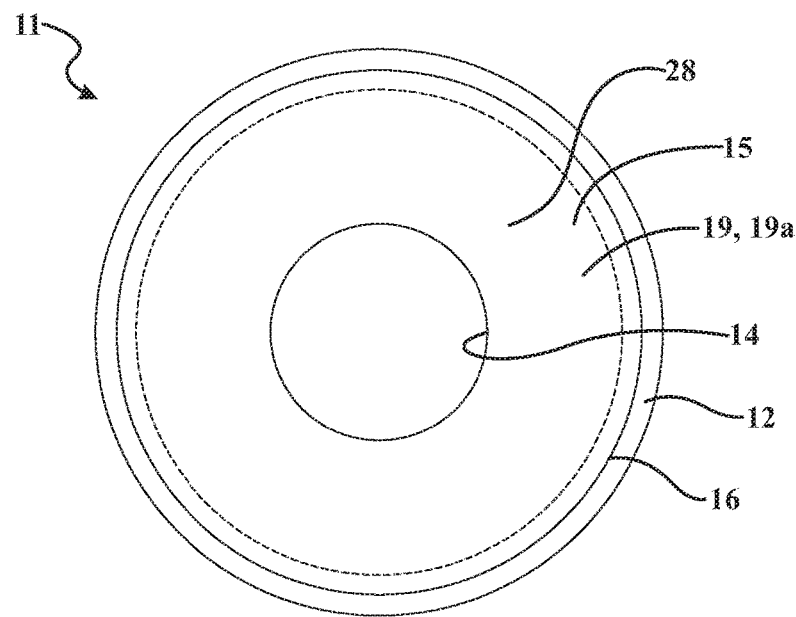
FIG. 2 is a front view of the heat shield of FIG. 1, e.g., as viewed in the direction of the arrow A of FIG. 1.
Figure 3:
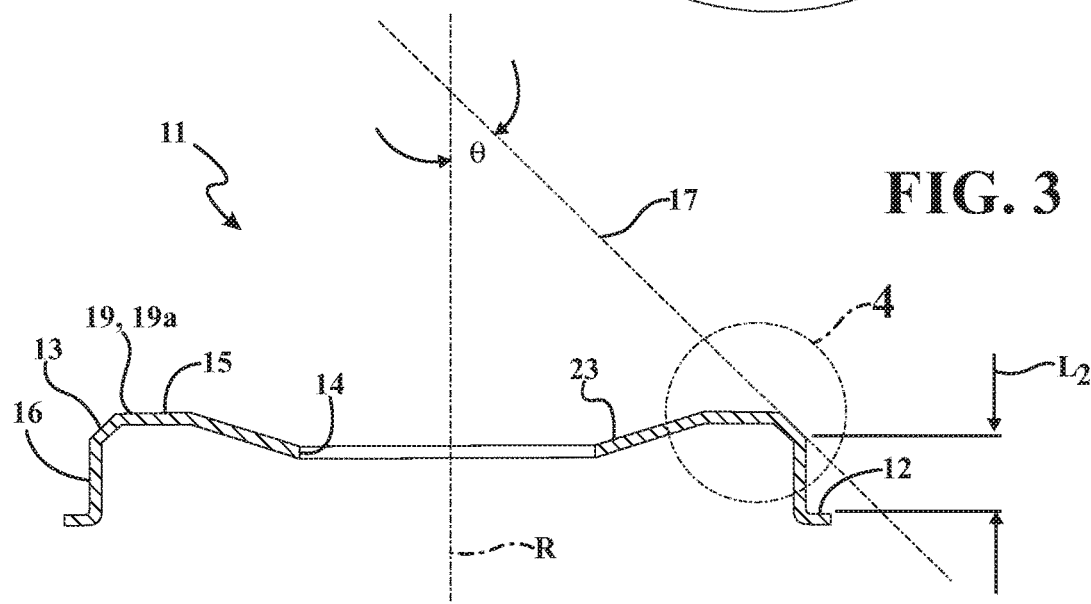
FIG. 3 is a cross-sectional view of the heat shield of FIG. 1.

Referring to FIGS. 2 and 3, the heat shield 11 has a shape that is configured to provide improved turbocharger efficiency relative to some turbochargers including a conventional heat shield. In particular, the heat shield 11 is a generally cup-shaped member having a cylindrical sidewall 16 and a closed end 19. The closed end 19 includes an outer surface 19a and has a center opening 14 formed therethrough. The closed end 19 includes a shoulder 15 formed about a periphery thereof that is oriented generally perpendicular to the sidewall 16, and an angled portion 28 that connects the shoulder 15 to the center opening 14. A contoured front edge 13, described in more detail below, connects the shoulder 15 to one end of the sidewall 16. The opposed end of the sidewall 16 includes a retaining tab 12 that extends outwardly therefrom. In particular, the tab 12 is parallel to the shoulder 15, and is disposed on an opposed side of the sidewall 16 relative to the shoulder 15.

Figure 4:
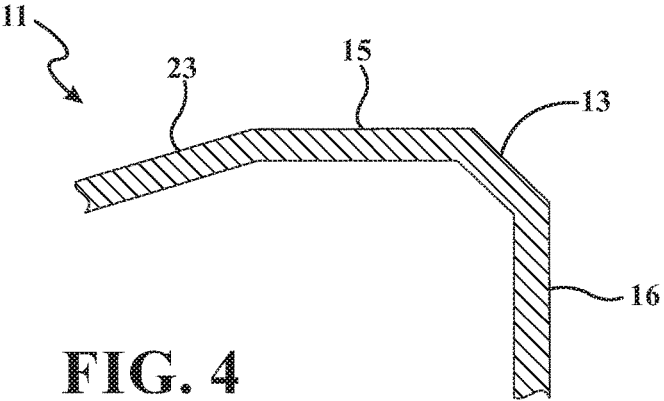
FIG. 4 is an enlarged view of the portion of the cross-sectional view of the heat shield encircled in dashed lines in FIG. 3, detailing the front edge of the heat shield.

Referring also to FIG. 4, the contoured front edge 13 of the heat shield 11 is a chamfered surface. The front edge 13 extends at a prescribed angle from the shoulder 15 to the sidewall 16 of the heat shield 11. A slope of the front edge 13 defines an extended imaginary line 17 that is angled relative to both the shoulder 15 and the sidewall 16.

The contoured front edge 13 of the heat shield 11 may be formed using a chamfering tool or may alternatively be formed as part of a stamping or other similar conventional operations known in the art for forming turbocharger heat shields.

Figure 5:
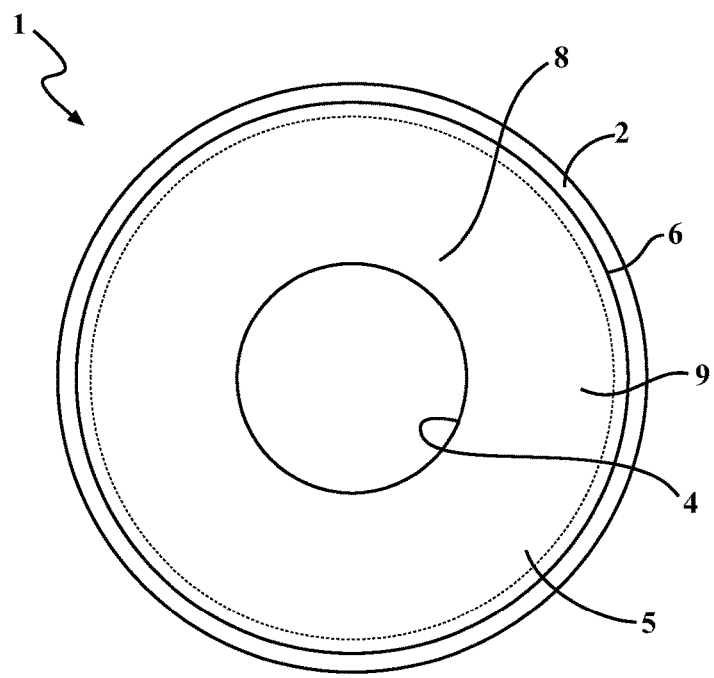
FIG. 5 is a front view of a conventional turbocharger heat shield.
Figure 6:
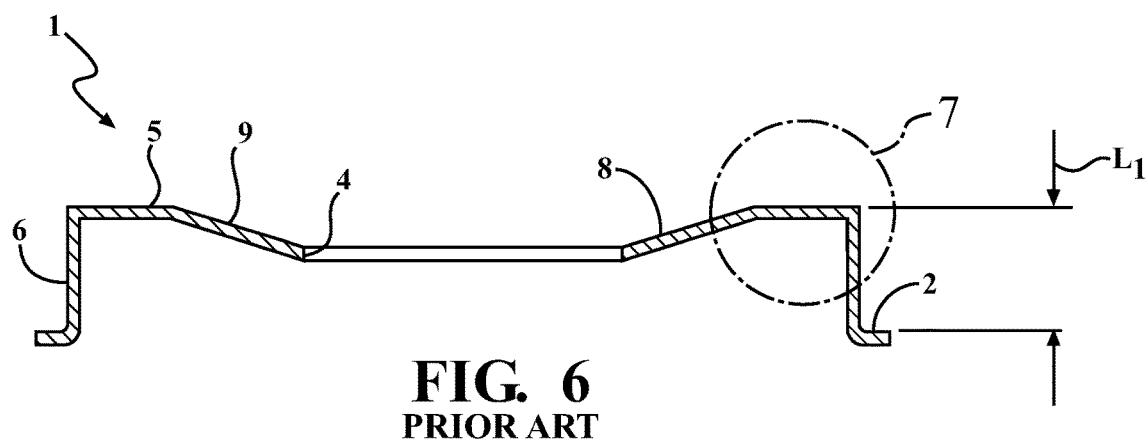
FIG. 6 is a cross-sectional view of the heat shield of FIG. 5.
Figure 7:
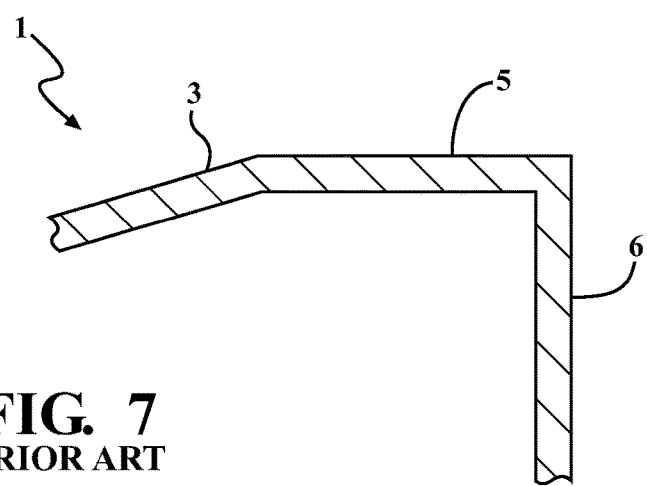
FIG. 7 is an enlarged view of the portion of the cross-sectional view of the heat shield encircled in dashed lines in FIG. 6, detailing the front edge of the heat shield.

The heat shield 11 can be compared to a conventional heat shield 1, shown in FIGS. 5-7. The conventional heat shield 1 is also generally cup-shaped, and includes a cylindrical sidewall 6 and a closed end 9. The closed end 9 has a center opening 4 formed therethrough. The closed end 9 includes a shoulder 5 formed about a periphery thereof so as to be generally perpendicular to the sidewall 6, and an angled portion 8 that connects the shoulder 5 to the center opening 4. In the conventional heat shield 1, the shoulder 5 is directly connected to one end of the sidewall 6, and the connection defines a right angle, forming a sharp corner at this location.

In addition, the sidewall length L1, corresponding to the distance between the shoulder 5 and a retaining tab 2 formed at an opposed end of the sidewall 6, is greater than the length L2 of the sidewall 16 of the heat shield 11.

Referring again to FIGS. 1 and 3, the heat shield 11 is disposed in the turbocharger 18 such that the retaining tab 12 is clamped between the turbocharger housing 38 and the bearing housing 22, the shaft 20 extends through the center opening 14, and the closed end 19 is disposed in a space between the turbocharger wheel 40 and and an axially-facing surface 22a of the bearing housing 22. In this configuration, the extended imaginary line 17 of the slope of the contoured chamfer front edge 13 intersects the axis of rotation R of the turbocharger shaft 20 at the prescribed angle (FIG. 3) of about 40 degree to 50 degrees. In addition, because the sidewall 16 has a length L2 that is short relative to the length L1 of a conventional heat shield 1, the closed end 19 of the heat shield 11 is positioned axially inward relative to the axially-inward edge 21 of the exhaust volute 24. This position is advantageous relative to that of a conventional heat shield 1, since the relatively short sidewall 16 positions the heat shield 11 out of the direct flow of exhaust gas. Also advantageously, the slope of the contoured chamfer front edge 13 enables exhaust gas to be directed from the exhaust volute 24, across variable guide vanes 23, directly onto the blade passage 46 defined between the hub 44 of the turbocharger wheel 40 and an inner surface 38a of the turbine housing 38.

In operation, exhaust gas from the engine is guided through the turbine housing 38 by the exhaust volute 24. Since the turbocharger 18 has a variable turbine geometry, the exhaust gases enter the turbine housing 38 from the exhaust volute 24 at an angle which is controlled by the variable guide vanes 23 in the turbine housing. Some of the exhaust gas coming from the exhaust volute 24 strikes the heat shield 11 and is redirected toward the turbine wheel 40. In the embodiment illustrated in FIGS. 1-4, the angle of the slope of the contoured front edge 13 allows the exhaust gas to be specifically redirected directly into the blade passage 46 and then onto the turbine wheel 40.

A mixed flow turbine wheel 40 has a hub diameter which is less than the diameter of the turbine wheel measured at the blade tips. The ratio of the diameter d1 of the wheel hub 44 to the diameter d2 of the turbine wheel 40 measured at the blade tips 42 can vary. In turbochargers according to one aspect of the disclosure, a ratio of the diameter of the wheel hub 44 to the diameter of the turbine wheel 40 as measured at the blade tips 42 (e.g., d1/d2), of approximately 0.8 to 0.9 has been found to be sufficient.

The turbocharger 18 operates using a variable turbine geometry technology including movable guide vanes 23, located in front (e.g., upstream) of the turbine wheel 40, to vary the geometry of the turbine housing 38. When the guide vanes 23 are in the closed position, the exhaust gas is directed toward the turbine wheel 40 through relatively narrow openings. This increases the gas speed, causing the turbine wheel 40 to spin faster than it would if the vanes 23 were open. When the guide vanes 23 are in the fully open position, the exhaust gas flow through the turbine section 30 is high.

In the turbocharger 18, the heat shield 11 is not in the stream of exhaust gas flowing to the turbine wheel 40. The heat shield 11 allows turbochargers to provide greater efficiency at small vane openings and decrease turbolag.

The contoured shape of the heat shield front edge 13 is not limited to a chamfer. For example, referring to FIG. 8, an alternative embodiment heat shield 111 includes a front edge 113 having a contoured shape that is rounded and convex. Also, referring to FIG. 9, another alternative embodiment heat shield 211 includes a front edge 213 having a contoured shape that is rounded and concave.

Figure 8:
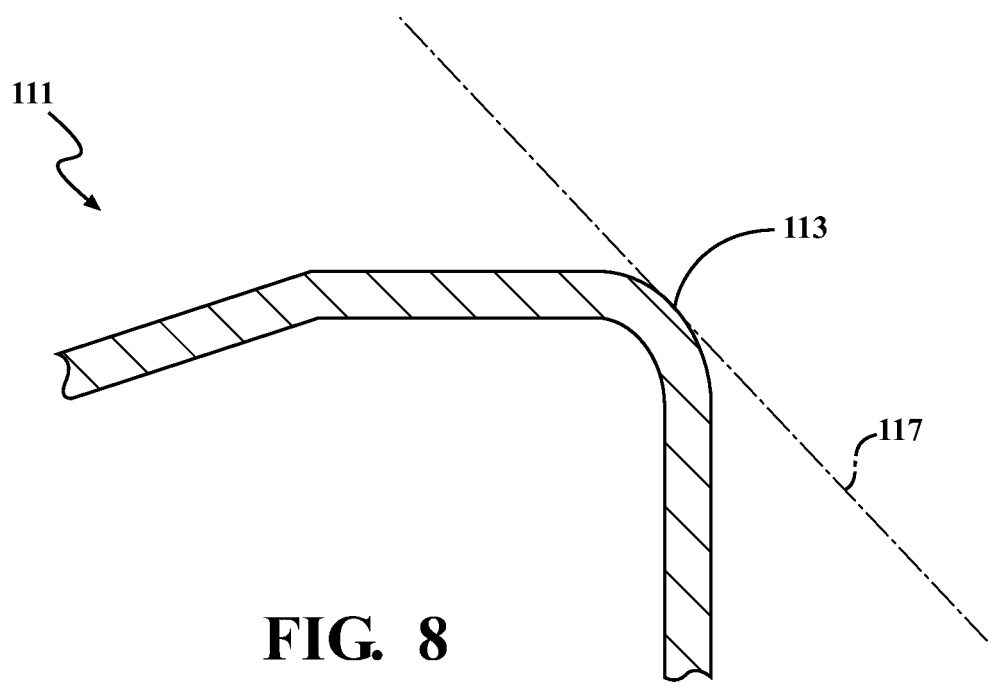
FIG. 8 is an enlarged view of a portion of a cross-sectional view of another embodiment heat shield showing the front edge of the heat shield as having a convex curve contoured shape.
Figure 9:
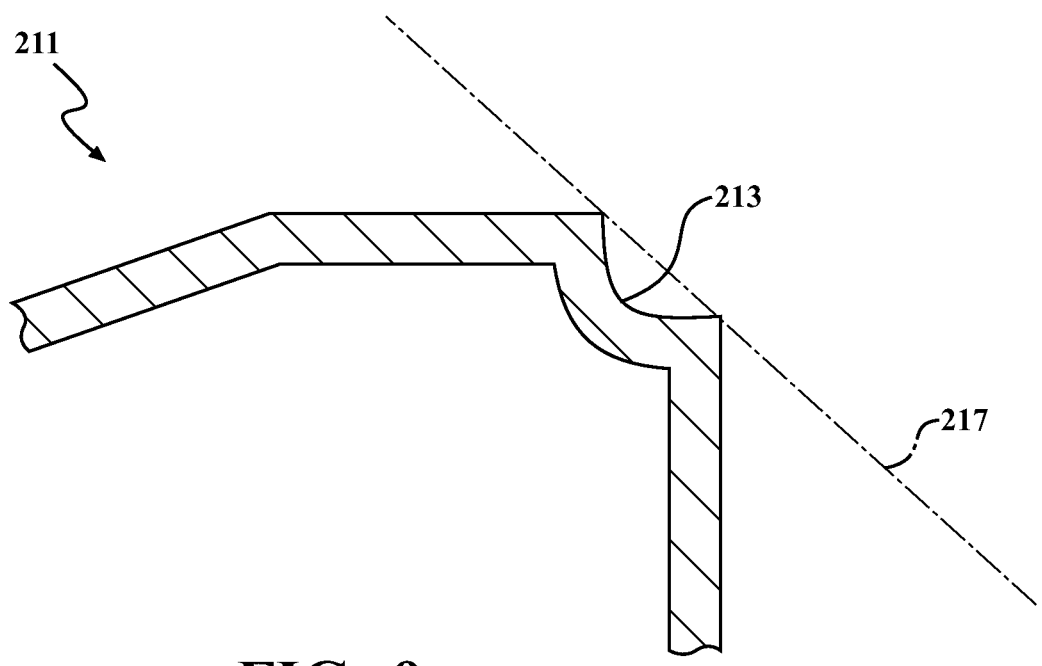
FIG. 9 is an enlarged view of a portion of a cross-sectional view of yet another embodiment heat shield showing the front edge of the heat shield as having a concave curve contoured shape.

As is with the preferred embodiment of the heat shield 11 shown in FIGS. 1-4, a slope of the contoured front edge 113, 213 of the alternative embodiment heat shields 111, 211 of FIGS. 8 and 9, defines an extended imaginary line 117, 217 that intersects the axis of rotation R of the turbocharger shaft 20 at a prescribed angle of about 40 degree to 50 degrees.

Example 1

A variable turbine geometry turbocharger having a mixed flow turbine and variable vanes was constructed. A conventional heat shield 1 was prepared having a 2 mm retaining tab, thus the conventional heat shield 1 had a total diameter of 67 mm. In addition, the front edge of the conventional heat shield 1 defined a sharp corner. In use within the turbocharger, the sharp corner was positioned within the gas stream. In addition, a mixed flow heat shield 11 according to the embodiment shown in FIGS. 1-4 was prepared. The heat shield 11 was 63 mm in diameter with a 2 mm retaining tab and a total diameter of 67 mm. The front edge 13 had a chamfered edge with a length of approximately 3 mm. The line defined by the chamfer made an angle of 42.3 degrees with the turbocharger shaft. The heat shield 11 had a sidewall length L2 that was shorter than the sidewall length L1 of the conventional heat shield 1. Thus, in use, the heat shield 11 was positioned behind (e.g., axially inward relative to) the exhaust volute. Both heat shields 1, 11 were tested in a gas stand. The gas stand conducted hot gas to the turbine portion of the turbocharger. The inlet pressure and the outlet pressure were measured. The rotation speed of the turbine was measured. The efficiency of the turbine was measured on a total/static basis for each heat shield. The measurements were performed with the vanes in the following two positions: 100 percent open and 20 percent open. The heat shield 11 according to the embodiment shown in FIGS. 1-4 is referred to as the Mixed Flow Heat Shield in Table 1 below, which shows the results of the tests.

TABLE 1

| | Pressure in / Pressure out | Turbocharger Speed (RPM) | Efficiency Total/ Static (%) | Mass Flow Rate (kg/s) |
|---|---|---|---|---|
| Conventional Heat Shield, Vane 100% Open | 1.6810 | 143,961 | 0.6865 | 0.2292 |
| Mixed Flow Heat Shield, Vane 100% Open | 1.6931 | 143,791 | 0.6943 | 0.2287 |
| Conventional Heat Shield, Vane 20% Open | 1.5102 | 105,607 | 0.4088 | 0.0913 |
| Mixed Flow Heat Shield, Vane 20% Open | 1.5336 | 105,608 | 0.4201 | 0.0928 |

While the disclosure has been shown and described with respect to the particular embodiments, it will be understood by those skilled in the art that various changes and modifications may be made without departing from the scope of the present invention as defined in the following claims.

We claim:

1. A turbocharger (18) comprising
   a shaft (20) having an axis of rotation (R),
   a mixed flow turbine wheel (40) connected to the shaft, the turbine wheel (40) including a wheel hub (44) and blades each having a single tip (42) at the radially outermost portion of the blades, and
   a heat shield (11) including a side wall (16), an end (19), and a contoured front edge (13) that connects the sidewall (16) and the end (19) that extends below the wheel hub (44),
   wherein the heat shield (11) is disposed between the turbine wheel (40) and a bearing housing (22),
   wherein the contoured front edge (13) of the heat shield (11) is inclined toward the blades such that the contoured front edge (13) defines a slope that forms an imaginary line (17) that is angled relative to the sidewall (16) and the end (19), and intersects the axis of rotation (R) of the shaft (20) at a non-perpendicular and non-parallel angle as a result of the incline of the contoured front edge (13),
   an exhaust volute having an axially-inward edge, wherein the end of the heat shield resides at a position axially inward relative to the axially-inward edge of the exhaust volute so that the heat shield is out of the direct flow of exhaust gas and so that exhaust gas is directed from the exhaust volute, across variable guide vanes, directly onto the blade passage defined between the hub of the turbocharger wheel and an inner surface of the turbine housing, wherein the contoured front edge comprises a chamfered surface, wherein the imaginary line (17) defined by the contoured front edge (13) of the heat shield (11) forms an angle of 41 degrees to 43 degrees with the axis of rotation of the shaft (20).

2. A turbocharger (18) comprising
a shaft (20) having an axis of rotation (R),
a mixed flow turbine wheel (40) connected to the shaft, the turbine wheel (40) including a wheel hub (44) and blades each having a single tip (42) at the radially outermost portion of the blades, and
a heat shield (11) including a side wall (16), an end (19), and a contoured front edge (13) that connects the sidewall (16) and the end (19) that extends below the wheel hub (44),
wherein the heat shield (11) is disposed between the turbine wheel (40) and a bearing housing (22),
wherein the contoured front edge (13) of the heat shield (11) is inclined toward the blades such that the contoured front edge (13) defines a slope that forms an imaginary line (17) that is angled relative to the sidewall (16) and the end (19), and intersects the axis of rotation (R) of the shaft (20) at a non-perpendicular and non-parallel angle as a result of the incline of the contoured front edge (13),
an exhaust volute having an axially-inward edge, wherein the end of the heat shield resides at a position axially inward relative to the axially-inward edge of the exhaust volute so that the heat shield is out of the direct flow of exhaust gas and so that exhaust gas is directed from the exhaust volute, across variable guide vanes, directly onto the blade passage defined between the hub of the turbocharger wheel and an inner surface of the turbine housing, wherein the contoured front edge comprises a chamfered surface, wherein the contoured front edge (13) comprises a concave surface wherein the imaginary line is drawn through a first point of the concave surface that meets the sidewall (16) and a second point of the concave surface that meets the end (19).

3. A turbocharger (18) comprising
a shaft (20) having an axis of rotation (R),
a mixed flow turbine wheel (40) connected to the shaft, the turbine wheel (40) including a wheel hub (44) and blades each having a single tip (42) at the radially outermost portion of the blades, and
a heat shield (11) including a side wall (16), an end (19), and a contoured front edge (13) that connects the sidewall (16) and the end (19) that extends below the wheel hub (44),
wherein the heat shield (11) is disposed between the turbine wheel (40) and a bearing housing (22),
wherein the contoured front edge (13) of the heat shield (11) is inclined toward the blades such that the contoured front edge (13) defines a slope that forms an imaginary line (17) that is angled relative to the sidewall (16) and the end (19), and intersects the axis of rotation (R) of the shaft (20) at a non-perpendicular and non-parallel angle as a result of the incline of the contoured front edge (13),
an exhaust volute having an axially-inward edge, wherein the end of the heat shield resides at a position axially inward relative to the axially-inward edge of the exhaust volute so that the heat shield is out of the direct flow of exhaust gas and so that exhaust gas is directed from the exhaust volute, across variable guide vanes, directly onto the blade passage defined between the hub of the turbocharger wheel and an inner surface of the turbine housing, wherein a length of the contoured front edge of the heat shield (11) is 4 percent to 8 percent of a diameter of the heat shield (11).

4. The turbocharger (18) according to claim 3 wherein a length of the contoured front edge of the heat shield (11) is 4.5 percent to 5.5 percent of a diameter of the heat shield (11).

5. A turbocharger (18) comprising
a shaft (20) having an axis of rotation (R),
a mixed flow turbine wheel (40) connected to the shaft, the turbine wheel (40) including a wheel hub (44) and blades each having a single tip (42) at the radially outermost portion of the blades, and
a heat shield (11) including a side wall (16), an end (19), and a contoured front edge (13) that connects the sidewall (16) and the end (19) that extends below the wheel hub (44),
wherein the heat shield (11) is disposed between the turbine wheel (40) and a bearing housing (22),
wherein the contoured front edge (13) of the heat shield (11) is inclined toward the blades such that the contoured front edge (13) defines a slope that forms an imaginary line (17) that is angled relative to the sidewall (16) and the end (19), and intersects the axis of rotation (R) of the shaft (20) at a non-perpendicular and non-parallel angle as a result of the incline of the contoured front edge (13),
an exhaust volute having an axially-inward edge, wherein the end of the heat shield resides at a position axially inward relative to the axially-inward edge of the exhaust volute so that the heat shield is out of the direct flow of exhaust gas and so that exhaust gas is directed from the exhaust volute, across variable guide vanes, directly onto the blade passage defined between the hub of the turbocharger wheel and an inner surface of the turbine housing, wherein the contoured front edge comprises a chamfered surface, wherein a ratio of a diameter of the wheel hub (44) to a diameter of the turbine wheel (40) measured at the blade tips (42) is 0.8 to 0.9.

* * * * *